US010323298B2

(12) United States Patent
Nakano et al.

(10) Patent No.: US 10,323,298 B2
(45) Date of Patent: Jun. 18, 2019

(54) METHOD FOR RECOVERING TARGET MATERIALS FROM SOURCE MATERIALS

(71) Applicant: United States Department of Energy, Washington, DC (US)

(72) Inventors: Jinichiro Nakano, Albany, OR (US); Anna Nakano, Albany, OR (US); James P. Bennett, Salem, OR (US)

(73) Assignee: U.S. Department of Energy, Washington, DC (US)

( * ) Notice: Subject to any disclaimer, the term of this patent is extended or adjusted under 35 U.S.C. 154(b) by 218 days.

(21) Appl. No.: 15/428,817

(22) Filed: Feb. 9, 2017

(65) Prior Publication Data

US 2018/0223391 A1    Aug. 9, 2018

(51) Int. Cl.

| C22B 5/02 | (2006.01) |
|---|---|
| C22B 7/00 | (2006.01) |
| C22B 23/02 | (2006.01) |
| C22B 34/22 | (2006.01) |
| C22B 5/10 | (2006.01) |

(Continued)

(52) U.S. Cl.
CPC ........ *C22B 23/021* (2013.01); *B01D 21/0009* (2013.01); *C01G 31/02* (2013.01); *C22B 5/02* (2013.01); *C22B 5/10* (2013.01); *C22B 7/001* (2013.01); *C22B 34/225* (2013.01); *Y02P 10/214* (2015.11)

(58) Field of Classification Search
CPC ....... C22B 23/021; C22B 34/225; C22B 5/02; C22B 7/0012
See application file for complete search history.

(56) References Cited

U.S. PATENT DOCUMENTS

| 4,312,919 A | * | 1/1982 | Devanney | ................... | B01J 8/24 110/347 |
| 4,826,627 A | * | 5/1989 | Najjar | ..................... | C01B 3/386 252/373 |
| 5,427,603 A | * | 6/1995 | Samant | ................... | C01G 31/02 423/594.17 |

(Continued)

OTHER PUBLICATIONS

N. Rokukawa, 'Recovery of V and Ni from Heavy Oil Ash,' Journal of the Japan Society of Waste Management Experts, 13(6), 2002, 387-393.

(Continued)

*Primary Examiner* — Tima M McGuthry-Banks
(74) *Attorney, Agent, or Firm* — Jennifer R. Mahalingappa; Robert T. Burns; Brian J. Lally (57) ABSTRACT

A single-heating stage method for reclaiming or recovering metals like nickel and vanadium from a petroleum waste byproduct has three steps: melting the petroleum waste byproduct in a reducing atmosphere, generating agglomerated metal in the melted byproduct, and lifting the agglomerated metal to an exposed surface of the melted byproduct. The metal precipitates out of the molten byproduct, agglomerates into a separate portion, and rises to an exposed surface of the melted petroleum waste byproduct even though the metal may have greater density than the molten petroleum waste byproduct. The original petroleum waste byproduct stratifies into a byproduct remnant and the agglomerated metal disk. The agglomerated metal disk is separable from the byproduct remnant and may be additionally separated into constituent metals in those embodiments with multiple metals in the disk.

20 Claims, 8 Drawing Sheets

(51) Int. Cl.
*B01D 21/00* (2006.01)
*C01G 31/02* (2006.01)

(56) References Cited

U.S. PATENT DOCUMENTS

| | | | | |
|---|---|---|---|---|
| 5,772,726 | A * | 6/1998 | Woods | C22B 4/005 |
| | | | | 420/590 |
| 6,039,790 | A | 3/2000 | Hultholm et al. | |
| 7,947,167 | B2 * | 5/2011 | Osaheni | C10G 25/06 |
| | | | | 208/251 R |
| 8,535,411 | B2 * | 9/2013 | Hendrickson | C21B 13/0066 |
| | | | | 75/485 |
| 2015/0139873 | A1 * | 5/2015 | Seetharaman | C21B 3/04 |
| | | | | 423/62 |

OTHER PUBLICATIONS

Yunjiao Li, Vladimiros G. Papangelakis, Ilya Perederiy, 'High Pressure Oxidative Acid Leaching of Nickel Smelter Slag: Characterization of Feed and Residue', Hydrometallurgy 97 (2009), pp. 185-193.

Oriol Font, Xavier Querol, Pilar Coca, Alejandro Munoz, Francisco Garcia-Peña, 'Reduction of Nickel Leachability from IGCC Slag', 2013 World of Coal Ash (WOCA) Conference—Apr. 22-25, 2013 in Lexington, KY.

Jian Pan, Guo-lin Zheng, De-qing Zhu, Xian-lin Zhou, 'Utilization of Nickel Slag Using Selective Reduction Followed by Magnetic Separation', Trans. Nonferrous Met. Soc. China 23(2013), pp. 3421-3427.

* cited by examiner

METHOD FOR RECOVERING TARGET MATERIALS FROM SOURCE MATERIALS

GOVERNMENT INTEREST STATEMENT

The United States Government has rights in this invention pursuant to the employer-employee relationship of the Government to the inventors as U.S. Department of Energy employees and site-support contractors at the National Energy Technology Laboratory under Contract No. DE-FE0004000.

FIELD

The present subject matter relates generally to recovering metals from petroleum waste byproducts.

BACKGROUND

Gasification is a process that converts carbon-based materials and water into hydrogen and carbon monoxide from a controlled reaction of the carbon with oxygen and water at elevated temperatures. The resulting synthesis gas may be used to generate electric power or produce chemicals. However, the process also generates petroleum waste byproducts, including petroleum coke ash and petroleum coke slag. In most cases, the petroleum waste byproducts contain valuable metals such as nickel, vanadium, and iron.

Conventional methods have been used to extract metals from petroleum waste byproducts, but these methods typically require leaching (acid and/or base leaching.) The leaching is, in general, a lengthy and less ecological process that generates additional waste products and may require additional processing to remove the metals from the leachate, extractant, and/or sorbent.

Therefore, a need exists for a simplified process with no leaching requirements for recovering metals from source materials like petroleum waste byproducts and ore.

SUMMARY

In one aspect, a method for recovering metal from a petroleum waste byproduct includes the steps of placing the petroleum waste byproduct in contact with a calcium-based additive layer so that the calcium-based layer underlies the petroleum waste byproduct; heating the petroleum waste byproduct in a reducing atmosphere for a predetermined length of time so that the petroleum waste byproduct separates into a main body of remnant material and a distinct portion, typically an upper layer of the metal, wherein the petroleum waste byproduct is heated in an environment at or above a melting point of the petroleum waste byproduct; cooling the petroleum waste byproduct; and removing the distinct portion/upper layer to recover the metal.

BRIEF DESCRIPTION OF THE DRAWINGS

A description of the present subject matter including various embodiments thereof is presented with reference to the accompanying drawings, the description not meaning to be considered limiting in any matter, wherein.

DETAILED DESCRIPTION

As discussed in greater detail below, exemplary embodiments of a method for reclaiming or recovering target materials, particularly metals like nickel and vanadium, from a source material may include three general steps: melting the source material in a reducing atmosphere, generating products—liquid and/or solid particles of the target material—in the melted byproduct, and the products rising to a point above an upper surface of the melted byproduct remnant. As used herein, "metal" may refer to an elemental metal, a metal oxide, and/or an alloy. The products may be denser than the molten source material. Due to interactions between the additive and the molten source material, the products precipitated out of the molten source material rise through the molten source material to a point above an exposed surface of the melted source material. This process stratifies the original source material into a remnant source material and an agglomerated product, which may form a disk or button. The agglomerated product disk is easily separated from the byproduct remnant and may be additionally separated into constituents if more than one target material is present in the source material.

Throughout the discussion below, use of the terms "about" and "approximately" are used to indicate engineering tolerances which are well understood by a person of ordinary skill in the art for any particular application or embodiment. For consistency and convenience, directional adjectives are employed throughout this detailed description corresponding to the illustrated embodiments, and, in some embodiments, "below", "under", and "bottom" indicate a direction aligned with the vector of acceleration due to gravity, while "above", "upper", and "top" indicate the opposite direction.

Figure 1:
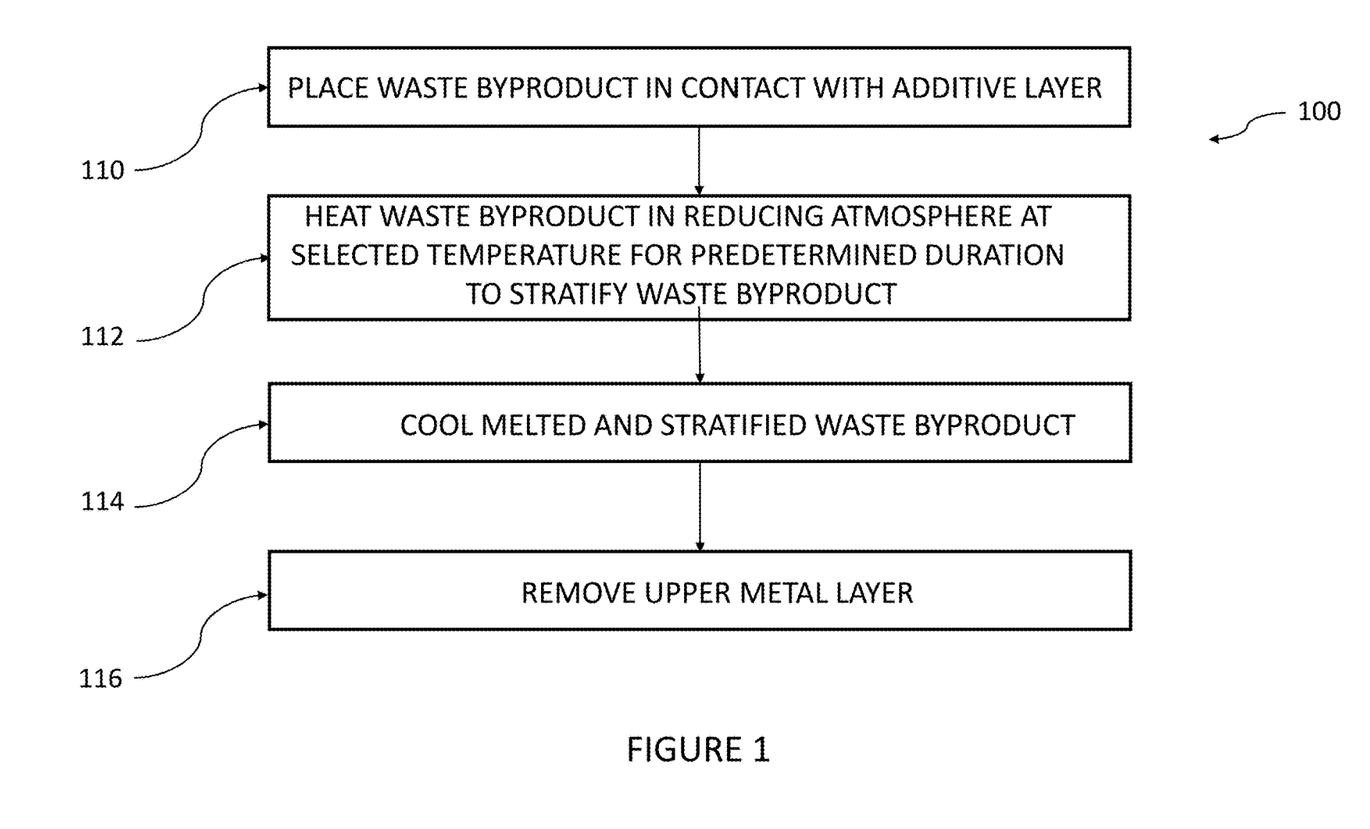
FIG. 1 illustrates an exemplary embodiment of a method for recovering metal from a petroleum waste byproduct.

FIG. 1 is a flow chart of an exemplary embodiment of a method of recovering metals from a source material without leaching. The source material may be obtained from any source, including the gasification industry, energy generation, metallurgical processes, and oil refining. In some embodiments, the source material may be petroleum coke (petcoke), petcoke ash, petcoke slag, or any material that contains at least one target material such as metal and metal oxides, such as nickel, vanadium, copper, iron, other metals, combinations of these metals, and/or all of these. In some embodiments, the original material may be a natural ore that contains the desired metals, though for simplicity, the discussion below will focus on petroleum waste byproducts. In some embodiments, only one metal is recoverable in the process. In other embodiments, multiple metals are recoverable using the process. The recoverability of a target material may depend upon such factors as the concentration of the metal within the petroleum waste byproduct and certain processing parameters such as temperature, soaking duration, and the oxygen partial pressure. In any embodiment, metals may be recovered in the metallic form and/or other forms such as oxides.

Method 100 shown in FIG. 1 includes four basic steps for recovering a metal from the petroleum waste byproduct. The steps of method 100 will be discussed generally, first, with a more detailed discussion provided with respect to FIGS. 3-9, below, which depict various steps in the methods.

In first step 110, the petroleum waste byproduct is placed in contact with an additive layer in a container. The additive layer may be a calcium-based material such as $CaCO_3$ and CaO, and/or other metal-based materials such as alumina, magnesia, soda, and dolomite, and/or combinations of these materials. In some embodiments, the calcium-based material is lime. In some embodiments, additive materials may be directly mixed with the petroleum waste byproduct to facilitate the interaction.

In step 110, both the petroleum waste byproduct and the additive layer are solid particulates. In some embodiments, the petroleum waste byproduct may have a particle size of 2 mm or less (10 mesh (US) or less). In some embodiments, the petroleum waste byproduct may have a particle size of 0.75 µm or less. In some embodiments, the petroleum waste byproduct may have uniform particle size while in other embodiments the size of the particles of the petroleum waste byproduct may vary.

In some embodiments, the additive material may have a particle size of less than 1 mm. In some embodiments, the additive material may have uniform particle size while in other embodiments the size of the particles of the additive material may vary. The mass ratio of petroleum waste byproduct to additive material may be 1:1 or smaller. For example, for every ton of petroleum waste byproduct, at least a ton of additive material is provided. Thickness of the additive material during the process may be determined by the mass of the additive, the density of the additive, the compactness or looseness of the additive, the size of the container, and the layer configuration.

In second step 112, the petroleum waste byproduct and additive layer are heated in a reducing atmosphere. The partial pressures of the reducing atmosphere may be selected according to factors such as the type of petroleum waste byproduct, the composition of petroleum waste byproduct, the type of metal desired to be recovered, the amount of excess carbon in the petroleum waste byproduct, and the existence of other non-desirable metals or impurities in the petroleum waste byproduct. For example, to extract a higher grade of metal, the partial pressures of the reducing atmosphere may be selected to inhibit extraction of impurities. In some embodiments, the reducing atmosphere is created by controlling the oxygen partial pressure in the atmosphere. In some embodiments, the oxygen partial pressure in the reducing atmosphere may be between $10^{-0.68}$ atmospheres and $10^{-24}$ atmospheres. In some embodiments, the oxygen partial pressure in the reducing atmosphere may be between $10^{-6}$ atmospheres and $10^{-12}$ atmospheres. In some embodiments, the oxygen partial pressure in the reducing atmosphere may be between $10^{-8}$ atmospheres and $10^{-16}$ atmospheres. In some embodiments, the oxygen partial pressure in the reducing atmosphere may be between $10^{-5}$ atmospheres and $10^{-20}$ atmospheres. In some embodiments, the oxygen partial pressure in the reducing atmosphere may be between $10^{-14}$ atmospheres and $10^{-24}$ atmospheres. In some embodiments, the oxygen partial pressure in the reducing atmosphere may be between $10^{-4}$ and $10^{-8}$ atmospheres. As is known to those of skill in the art, oxygen partial pressures vary with temperature in carbon-containing gases and the ranges given above may be adjusted accordingly.

The temperature for the heating process in second step 112 may be selected according to factors such as the type of petroleum waste byproduct, the composition of petroleum waste byproduct, particularly the amount of carbon in the petroleum waste byproduct, the quantity of petroleum waste byproduct, the type of additive, and the type of target material desired to be recovered. The selected temperature is higher than the melting point of the petroleum waste byproduct. In some embodiments, the selected temperature is equal to or greater than the melting point of the target material to be recovered. In some embodiments, the selected temperature is equal to or greater than the melting point of at least one of the target materials to be recovered but less than the melting point of another target material(s) to be recovered. In some embodiments, the selected temperature is less than the melting point of the metal or the metal oxide to be recovered. In some embodiments, the selected temperature may be greater than 600 degrees C. In other embodiments, the selected temperature may be greater than 1400 degrees C. In some embodiments, the selected temperature may be between 1400 degrees C. and 1600 degrees C. In some embodiments, the selected temperature may be between 1200 degrees C. and 1600 degrees C. In some embodiments, the selected temperature may be between 1500 degrees C. and 1900 degrees C.

In second step 112, the petroleum waste byproduct and additive layer are heated for a predetermined duration. The predetermined duration depends on factors such as the melting point of the petroleum waste byproduct, the temperature, the layer thicknesses of the petroleum waste byproduct and the additive layer, the heat conductivities of the petroleum waste byproduct and the additive layer, the particle sizes of the petroleum waste byproduct and the additive layer, the surface area contact between the petroleum waste byproduct and the additive layer, and other factors apparent to those of skill in the art. The predetermined duration lasts until the petroleum waste byproduct melts and the products stratify with respect to a remnant petroleum waste byproduct. In some embodiments, the products agglomerate into a single portion. In some embodiments, the products stratify into a layer distinct from the remnant petroleum waste byproduct. In some embodiments, the stratified products layer may be agglomerates or aggregates of the products. In some embodiments, the products lift, rise, or float to above the top of the remnant petroleum waste byproduct so that the products layer is formed on an exposed surface of the remnant petroleum waste byproduct. In some embodiments, the predetermined duration is at least 10 minutes. In some embodiments, the predetermined duration is less than 10 minutes, particularly in those embodiments where the petroleum waste byproduct has been preheated prior to being placed in contact with the additive layer. In some embodiments, the predetermined duration is 3 hours or less. Manipulation of the duration of heating above or below the durations noted above to achieve a certain result or to reach a certain endpoint will be apparent to those of ordinary skill in the art.

In third step 114, the stratified petroleum waste byproduct is cooled. In some embodiments, the stratified petroleum waste byproduct is cooled until the remnant petroleum waste byproduct and the distinct products layer solidify. In some embodiments, the stratified petroleum waste byproduct is cooled until the remnant petroleum waste byproduct vitrifies and at least one of the distinct products solidifies. In some embodiments, the stratified petroleum waste byproduct is cooled to room temperature, which may be about 20 degrees C. In some embodiments, the stratified petroleum waste byproduct is not cooled if favored for a continuous process. In some embodiments, the stratified petroleum waste byproduct may be cooled to more than 20 degrees C. or less than 20 degrees C. depending upon the ambient conditions and the degree of acceptable or desired solidification, and the selection of the cooling temperature will be readily apparent to those of ordinary skill in the art based upon the desired next steps.

In fourth step 116, the distinct portion of products, typically formed as an upper layer, is removed from the remnant petroleum waste byproduct. In some embodiments, the distinct products layer is physically removed from the remnant waste by severing a weak joint between the remnant petroleum waste byproduct and the distinct products layer. In some embodiments, the physical removal may involve cutting or slicing the distinct products layer from the remnant petroleum waste byproduct. In other embodiments, the physical removal may include grasping the distinct products layer and/or the remnant petroleum waste byproduct and creating relative motion (or shear) between the distinct products layer and/or the remnant petroleum waste byproduct. The relative motion causes the weak joint to give way. Other methods of separating the distinct products layer from the remnant petroleum waste byproduct will be readily apparent to those of ordinary skill in the art.

Figure 2:
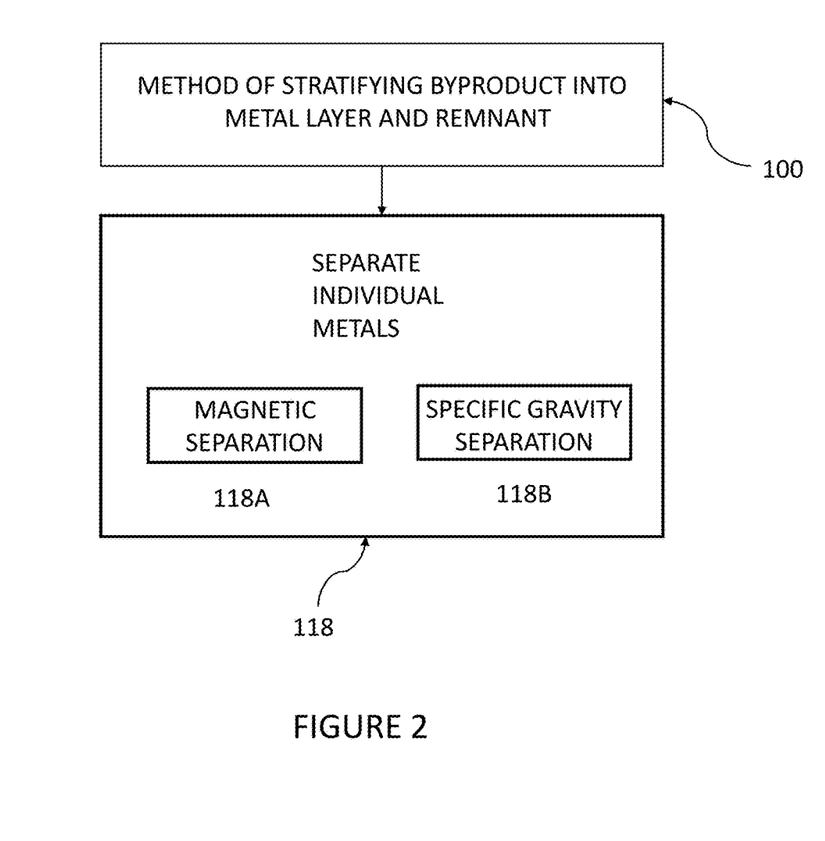
FIG. 2 illustrates optional additional steps of the exemplary method shown in FIG. 1.

FIG. 2 shows an optional step 118 for those embodiments where more than one metal is extracted from the petroleum waste byproduct into the metal layer. In such embodiments, optional step 118 is the separation of the individual metals within the metal layer from the other metal or metals in the metal layer. Conventional methods for separating the metals include crushing, followed by magnetic separation 118A and specific gravity separation 118B. In some embodiments, only magnetic separation 118A is used. In some embodiments, only specific gravity separation 118B is used. In some embodiments, a combination of magnetic separation 118A and specific gravity separation 118B is used. Other methods of separating the distinct products layer into individual constituents will be readily apparent to those of ordinary skill in the art.

Figure 3:
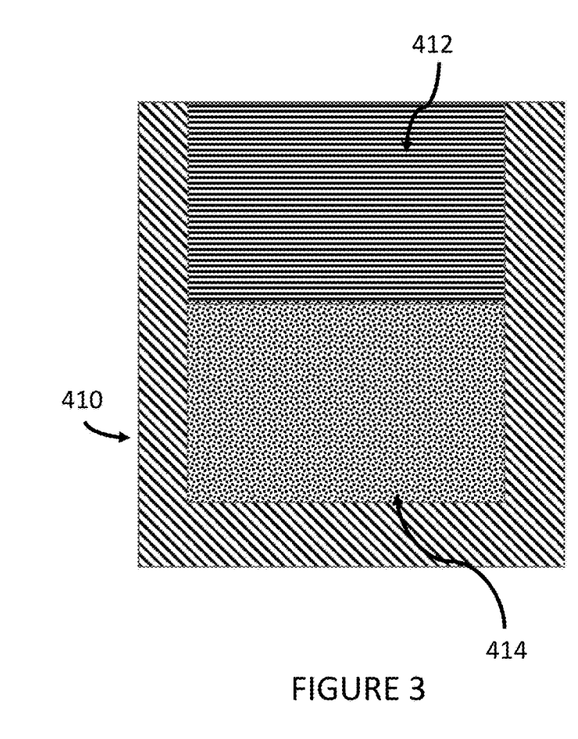
FIG. 3 illustrates a schematic cross-sectional view of a first step in an exemplary embodiment of a method of recovering metal from a petroleum waste byproduct, where the byproduct is placed in contact with an additive.

To further explain the steps of method 100 and possible variations of those steps, FIGS. 3-9 show an embodiment of the method. In FIG. 3, a portion of additive 414 is placed in a container 410. Container 410 may be any type of container capable of withstanding the heat, the interaction with additive and petroleum waste byproduct, and the reducing atmosphere. In some embodiments, container 410 may be a ceramic crucible. In some embodiments, container 410 may be a refractory crucible.

Additive 414 may be any type of calcium-base material. In some embodiments, a form of calcium carbonate may be provided as additive 414. In some embodiments, calcium oxide may be provided as additive 414. In some embodiments, calcium hydroxide may be provided as additive 414. In some embodiments, other metal-based materials such as alumina, magnesia, soda, and dolomite may be provided as additive 414. In some embodiments, combinations of calcium carbonate, calcium oxide, calcium hydroxide, alumina, magnesia, soda, and/or dolomite may be provided as additive 414. In some embodiments, additive 414 is lime. In certain embodiments where the calcium-based material for additive 414 does not contain carbon or where additional carbon may be beneficial to the reaction, carbon may be added to additive 414 to facilitate the reaction. In other embodiments where additional carbon may be desired, the additional carbon such as carbon powder, coal, and/or petcoke may be positioned proximate or in contact with petroleum waste byproduct 412 in the reducing environment.

As discussed above, additive 414 may be a solid particulate. In some embodiments, the particulate size may be about 1 mm. In some embodiments, the particulate size may vary, with a maximum particle size of about 1 mm. In other embodiments, the particulate size may be greater or smaller than 1 mm and may be uniform or varied, depending upon such factors as the size and shape of container 410, the size and shape of the solid particulates of the petroleum waste byproduct, the composition of petroleum waste byproduct, and the composition of additive 414.

Another factor influencing the selection of the size of the particulate of additive 414 is the shape of the base layer formed by additive 414. As shown in FIG. 3, additive 414 in the base layer has a rectangular cross-sectional shape that conforms to the interior space of container 410. In other embodiments, however, additive 414 may be shaped to have greater surface area contact between additive 414 and petroleum waste byproduct 412. For example (not shown), additive 414 may have an inverted conical shape where the large part of the cone is configured to fill or substantially fill the bottom of container 410 or to establish a footprint on a conveyor belt. The bottom of container 410 may be a conveyor belt to enable a continuous process. The sides of the inverted cone would, therefore, taper to a point in the center of container 410 or a specified distance above the surface of a conveyor belt. Instead of merely layering above additive 414, petroleum waste material could surround additive 414 for greater surface area contact and a reduced duration of the heating process. The particulate size of additive 414 may be greater or smaller than 1 mm depending upon, for example, the angle of repose for a granular structure, to maintain the shape of additive 414 while the petroleum waste byproduct is being placed on top of additive 414.

Once additive 414 is in position in container 410, solid granular petroleum waste byproduct 412 is placed in container 410 in contact with additive 414. In some embodiments, at this point in the process, solid granular petroleum waste byproduct 412 is at the same temperature as container 410 and additive 414. In some embodiments, this temperature may be room temperature or about 20 degrees C. In other embodiments, as discussed above, solid granular petroleum waste byproduct 412 may be heated to a point at or near the melting point of petroleum waste byproduct 412. This preheating step may occur as the petroleum waste byproduct is being generated by a gasification or other process, so that the petroleum waste byproduct is not cooled prior to being introduced to the process only to be reheated. Such preheating can provide additional efficiencies, particularly if the systems for carrying out method 100 are in the same facility as the gasification or other process that generates the petroleum waste byproduct 412. Hot petroleum waste byproduct 412 may be conveyed directly from the point of generation to container 410.

Figure 4:
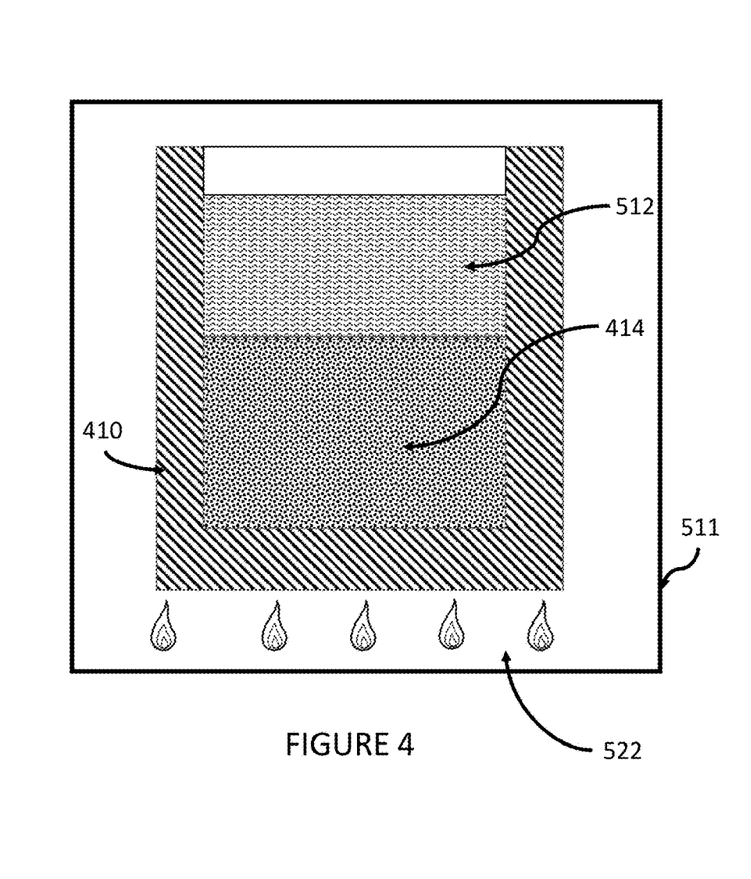
FIG. 4 illustrates a schematic cross-sectional view of another step in an exemplary embodiment of a method of recovering target materials from a source material, where the source material and additive are being heated in a reducing atmosphere.

After solid petroleum waste byproduct 412 has been positioned in contact with additive 414, container 410 is positioned in furnace 511 or other enclosed space. Furnace 511 is configured to heat container 410 and its contents and also to provide a reducing atmosphere for the process. Furnace 511 may be any facility, apparatus, or piece of equipment capable of withstanding the applied heat for melting solid petroleum waste byproduct 412 and for sealing in the reducing atmosphere. The heating in furnace 511 may be provided by any type of heating element 522 or generator known in the art capable of generating and maintaining the desired temperature, such as an open flame, coils, radiant heating, radiation, microwave radiation, induction, convection, or the like.

In some embodiments, such as where solid petroleum waste byproduct 412 is petcoke, petcoke ash, or petcoke slag, the process temperature required to transition solid petroleum waste byproduct 412, shown in FIG. 3, to melted petroleum waste byproduct 512 shown in FIG. 4, and to maintain the extraction process is 600 degrees C. or more. In some embodiments, the process temperature may be above 1400 degrees C. In some embodiments, the process temperature may be capped at 1600 degrees C. so that the petroleum waste byproduct remains melted and does not combust or otherwise chemically break down. In some embodiments, the process temperature is between 1400 degrees C. and 1600 degrees C.

Furnace 511 is also configured to provide a reducing atmosphere. In some embodiments, the reducing atmosphere is provided by mechanisms that control the oxygen partial pressure within furnace 511. In some embodiments, the reducing atmosphere is provided from added carbon sources such as coal and petcoke, and/or additive 414 within furnace 511. In some embodiments, the oxygen partial pressure within furnace 511 is between $10^{-0.68}$ atmospheres and $10^{-20}$ atmospheres. In some embodiments, the oxygen partial pressure within furnace 511 is between $10^{-6}$ atmospheres and $10^{-12}$ atmospheres. In some embodiments, the purity of the extracted metals may be controlled in part by the level of the oxygen partial pressure within furnace 511. Oxygen partial pressure dictates the thermodynamic stability of individual materials and solubility of them in molten petroleum waste byproduct at a given temperature and total pressure. In general, a high oxygen partial pressure promotes oxidation of metals while a low oxygen pressure facilitates reduction of oxide or maintains the metallic phase. Oxygen partial pressure and temperature at a constant pressure are adjusted so that target materials precipitate as metals and/or metal oxides or so that the target materials are dissolved in the melted petroleum waste byproduct, depending on the purposes and stages of the process.

Method 100 contemplates the petroleum waste byproduct to remain in the furnace under the desired temperature and partial oxygen pressure for a predetermined length of time. The duration of the heating process may depend upon such factors as the type of petroleum waste byproduct, the type of metals desired to be recovered, the amount of petroleum waste byproduct, the amount of the metals to be recovered, and any preheating of the petroleum waste byproduct. In some embodiments, the duration of the heating process may be 10 minutes. In other embodiments, the duration of the heating process may be several hours. In some embodiments, the duration of the heating process may be three hours or more. In some embodiments, the duration of the heating include the length of heating to the target temperature.

Figure 5:
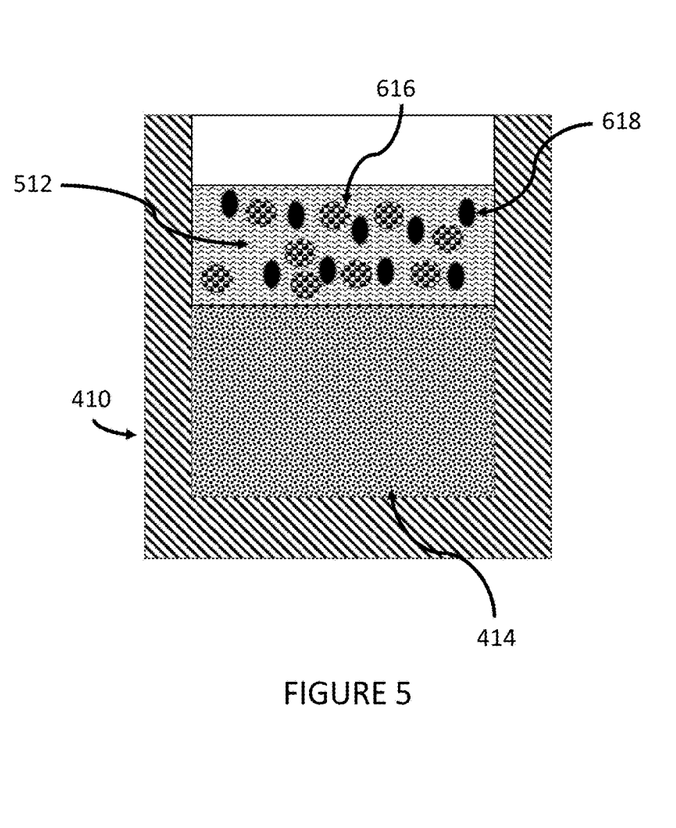
FIG. 5 illustrates a schematic cross-sectional view of another step in an exemplary embodiment of a method of recovering target materials from a source material, where products including the target materials in the source material precipitate out of the molten source material.

FIGS. 5-8 show parts of method 100 that also take place within furnace 511, but for clarity and simplicity furnace 511 is not shown in those figures. In FIG. 5, the heat and the partial oxygen pressure and the reaction between molten petroleum waste byproduct 512 cause metals in the petroleum waste byproduct to liquefy and/or to precipitate out of molten petroleum waste byproduct 512. While many different reactions are possible depending upon the types of materials for the source material, the additive, and the target materials, one example of such a reaction for extracting nickel and vanadium oxide is $$NiO_{(petroleum\ waste\ byproduct)} \rightarrow Ni_{(liquid)} + \tfrac{1}{2}O_{2(gas)}\ \text{and}$$
$$V_2O_{5(petroleum\ waste\ byproduct)} \rightarrow V_2O_{3(solid)} + O_{2(gas)} \qquad \text{Eq. 1}$$

For example, in some embodiments, nickel may liquefy within molten petroleum waste byproduct 512 to form liquid nickel droplets 616. In some embodiments, vanadium may precipitate out of molten petroleum waste byproduct 512 to form solid vanadium oxide particles 618. In some embodiments, both liquid nickel droplets 616 and vanadium oxide particles 618 form in molten petroleum waste byproduct 512. In some embodiments, nickel may precipitate as a solid out of molten petroleum waste byproduct 512. In some embodiments, different metals may form as liquid droplets and/or solid particles in molten petroleum waste byproduct 512.

Figure 6:
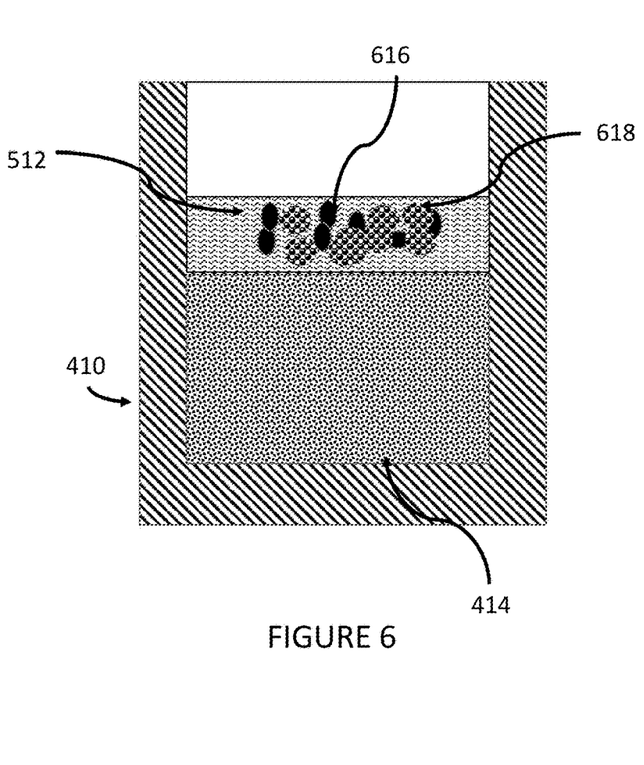
FIG. 6 illustrates a schematic cross-sectional view of another step in an exemplary embodiment of a method of recovering target materials from a source material, where the products in the molten source material agglomerate.

As the interaction between molten petroleum waste byproduct 512 and additive 414 continues, the metal droplets and precipitated solid particles would migrate towards each other to form an agglomerated mass of product, in some embodiments, metal and metal oxides, within the molten petroleum waste byproduct 512. As shown in the embodiment of FIG. 6, liquid nickel droplets 616 migrate towards and intermingle with solid vanadium oxide particles 618. In other embodiments, other metals, metal oxides, and/or alloys may be present in the agglomerated mass of metal.

Figure 7:
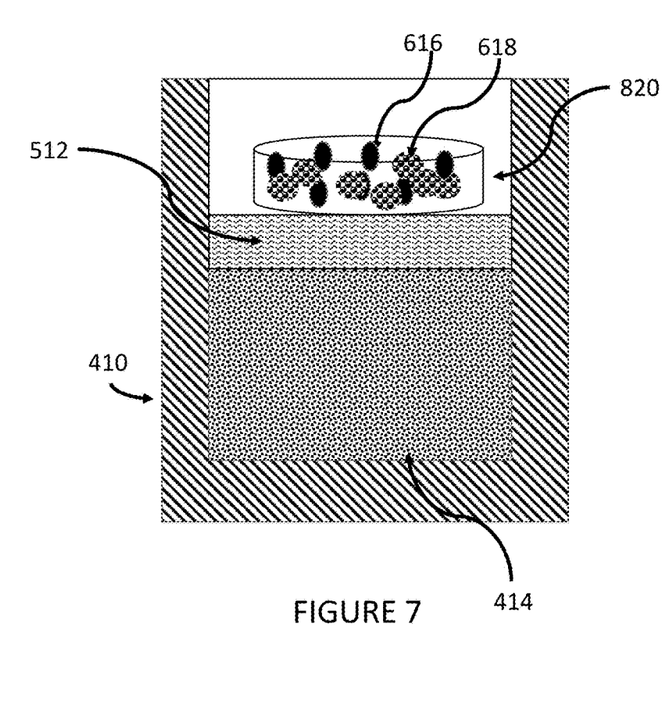
FIG. 7 illustrates a schematic cross-sectional view of another step in an exemplary embodiment of a method of recovering target materials from a source material, where the agglomerated products rise to above an exposed surface of the molten remnant source material.

As the interaction between molten petroleum waste byproduct 512 and additive 414 continues further, the molten petroleum waste byproduct stratifies so that the agglomerated mass of metal is lifted out of molten petroleum waste byproduct 512 to rise to a point above an upper surface of molten petroleum waste byproduct 512 as an agglomerated disk 820. In some embodiments, the upper surface is an exposed surface where the upper surface has a greater surface area than agglomerated disk 820. The metals of agglomerated disk 820 may be denser than molten petroleum waste byproduct 512, but agglomerated disk 820 is rejected by additive layer 414 due to the interaction of the additive and molten petroleum waste byproduct 512 where molten petroleum waste byproduct 512 is more favored by additive layer 414 over agglomerated disk 820.

In some embodiments, agglomerated disk 820 is coextensive with the surface of molten petroleum waste byproduct 512, while in other embodiments, such as shown in FIG. 7, agglomerated disk 820 is smaller in surface area than the molten petroleum waste byproduct 512 and rests on an exposed surface of molten petroleum waste byproduct 512. While the agglomerated disk may have any shape, agglomerated disk 820 may in some embodiments be generally frustoconical in shape with a substantially circular cross-sectional shape, while in other embodiments the shape may be conical, columnar, and/or the shape and/or the cross-sectional shape may be irregular. In FIG. 7, agglomerated disk 820 includes liquid nickel droplets 616 migrated towards and/or intermingled with solid vanadium oxide particles 618. In other embodiments, other metals, metal oxides, and/or alloys may be present in agglomerated disk 820. In some embodiments, agglomerated disk 820 contains metals with very few impurities.

Figure 8:
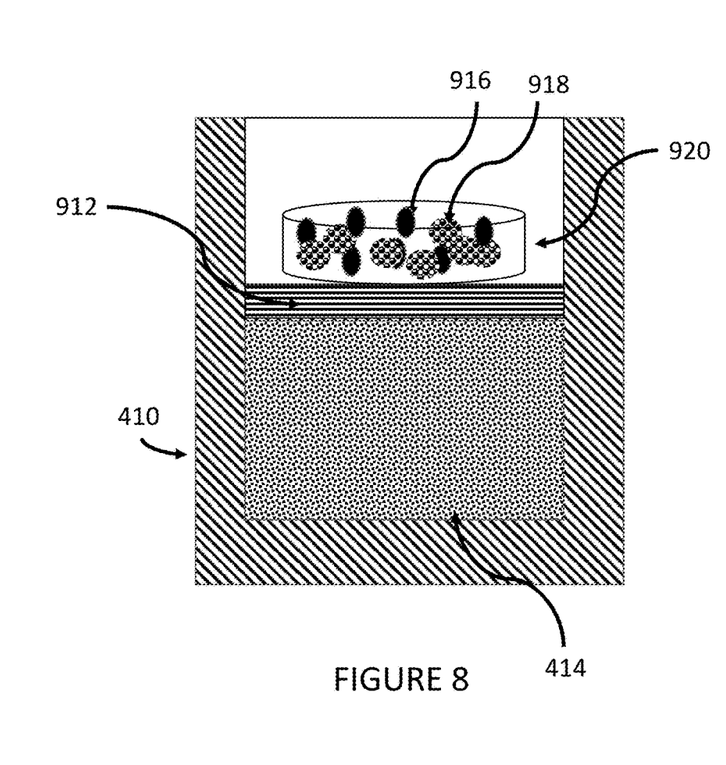
FIG. 8 illustrates a schematic cross-sectional view of another step in an exemplary embodiment of a method of recovering target materials from a source material, where the molten remnant source material and the agglomerated products are cooled to solid.

FIG. 8 shows an embodiment of third step 114 of method 100, where the stratified waste product is cooled until the layers within container 410 resolidify. In some embodiments, the stratified petroleum waste byproduct is cooled to room temperature, which is about 20 degrees C. In other embodiments, the stratified waste product is cooled to a temperature warmer than or cooler than room temperature, depending upon such factors as the length of time required to achieve the desired temperature and the next processing steps and/or ultimate use of the recovered metals. For example, if the metals are to be taken for immediate re-melting, cooling the stratified petroleum waste byproduct to a temperature below the melting point but higher than room temperature may be desirable. In some embodiments, heat is recovered from the stratified petroleum waste byproduct to be recycled into the process or for other purposes.

Figure 9:
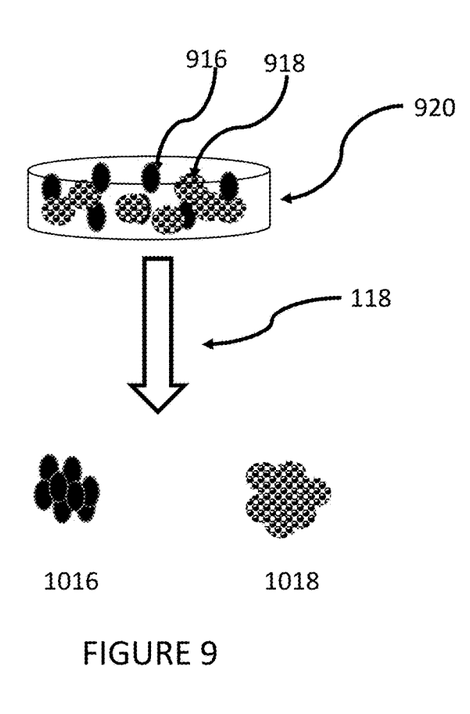
FIG. 9 illustrates a schematic cross-sectional view of another step in an exemplary embodiment of a method of recovering target materials from a source material, where the agglomerated products have been removed from the remnant source material and separated into constituent independent metals.

Cooling the stratified petroleum waste byproduct until the layers solidify allows for easy removal of the distinct portion or upper layer of metal, agglomerated disk 920, from the main body of remnant petroleum waste byproduct 912. As discussed above, while agglomerated disk 920 is attached to remnant petroleum waste byproduct 912, the attachment is generally weak. Agglomerated disk 920 may be mechanically snapped off if detachment is required, or otherwise separated and lifted away from remnant petroleum waste byproduct 915.

FIG. 9 shows an embodiment of optional step 118, wherein the agglomerated disk or upper metal layer has been removed from the remaining petroleum waste byproduct and is being separated into its constituent metal parts. The individual metals, metal oxides, and/or alloys can be separated and fully recovered using any method known in the art, such as magnetic separation when some of the metals are influenced by magnetism and specific gravity separation. Such methods are well known to those of skill in the art.

EXAMPLE

The above-described method was used to separate nickel and vanadium from a synthetic petcoke ash sample. Table 1 shows the composition of the petcoke ash sample.

TABLE 1

Petcoke Ash Sample Composition

| Compound | Percent by weight |
|---|---|
| $Al_2O_3$ | 4.83 |
| $SiO_2$ | 14.31 |
| $Fe_2O_3$ | 7.35 |
| CaO | 5.44 |
| MgO | 1.01 |
| $Na_2O$ | 0.50 |
| $K_2O$ | 0.81 |
| $V_2O_3$ | 57.93 |
| NiO | 7.82 |

Following method 100 described above, $Al_2O_3$ was positioned in the bottom of a crucible as a first layer. 1.5 grams of $CaCO_3$ having a particle size of 200 μm or less was layered on top of the $Al_2O_3$. Finally, 1.0 grams of the petcoke ash sample having a particle size of 200 μm or less was placed in the crucible on top of and in contact with the $CaCO_3$. The loaded crucible was placed in a semi-hermetically-sealed oven containing a container of carbon powder is placed in the oven and argon gas was flown through the oven to control the oxygen partial pressure within the oven. Oxygen partial pressure in the oven was expected to be below $10^{-4}$ atmospheres at 1520 degrees C. The crucible was heated at 1520 degrees C. for 3 hours, then the crucible is cooled to room temperature, about 20 degrees C.

Figure 10:
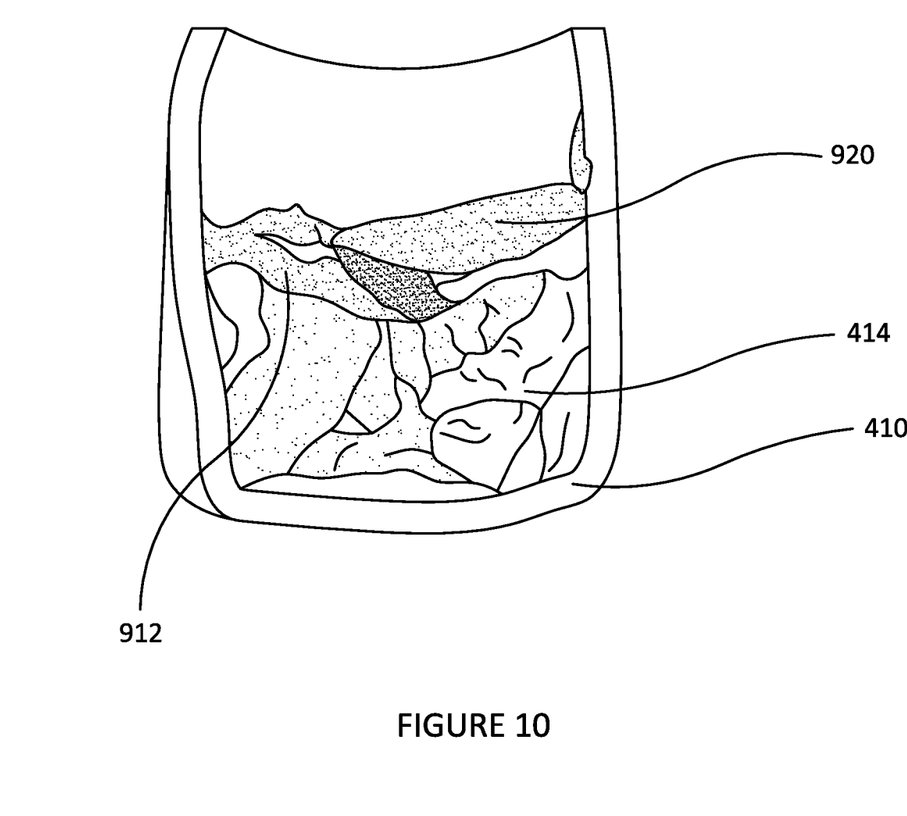
FIG. 10 is an enlarged cross-sectional photograph of a crucible containing cooled additive, solid remnant petroleum waste byproduct, and an agglomerated disk of products that has been stratified from the solid remnant petroleum waste byproduct.

FIG. 10 is a photograph of a cross-section of the cooled crucible 410. The additive $CaCO_3$ is the white layer 414 at the bottom of the crucible. The remnant petroleum waste byproduct is shown as a gray layer 912 on top of the $CaCO_3$. An agglomerated disk of nickel and vanadium oxide is the granular gray disk 920 sitting on the exposed surface of the $CaCO_3$. The agglomerated disk was not only chemically but also physically detached from the $CaCO_3$, and the agglomerated disk of nickel and vanadium oxide was readily and easily mechanically separated from the remnant petroleum waste byproduct as the agglomerated disk of nickel and vanadium oxide was simply sitting on top of the cooled remnant petroleum waste byproduct.

Figure 11:
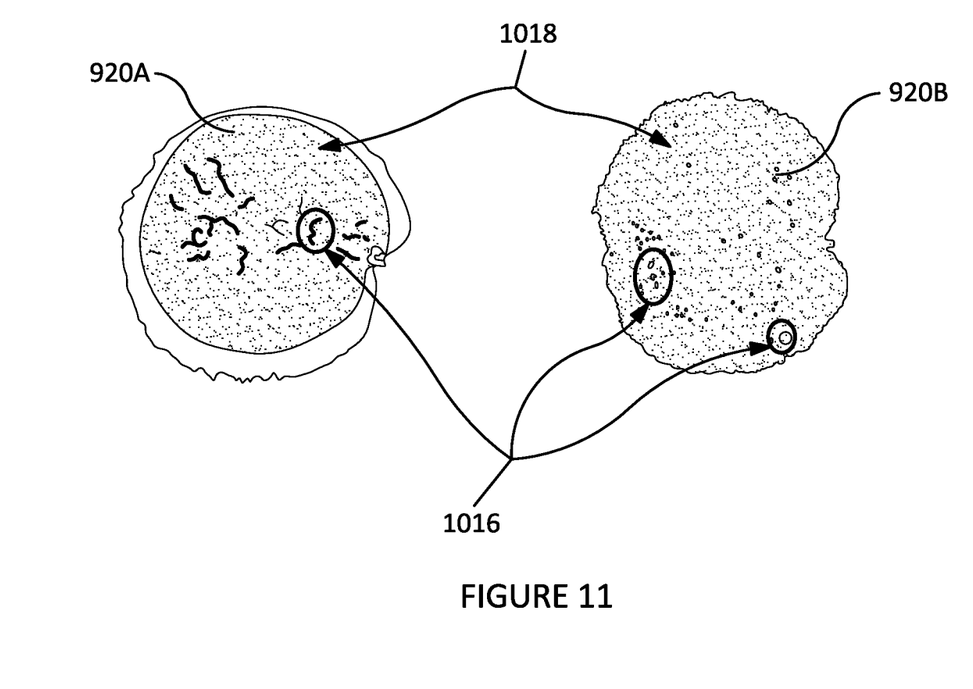
FIG. 11 shows enlarged photographs of the top and bottom sides of an agglomerated disk of products that has been removed from the solid remnant petroleum waste byproduct.
Figure 12:
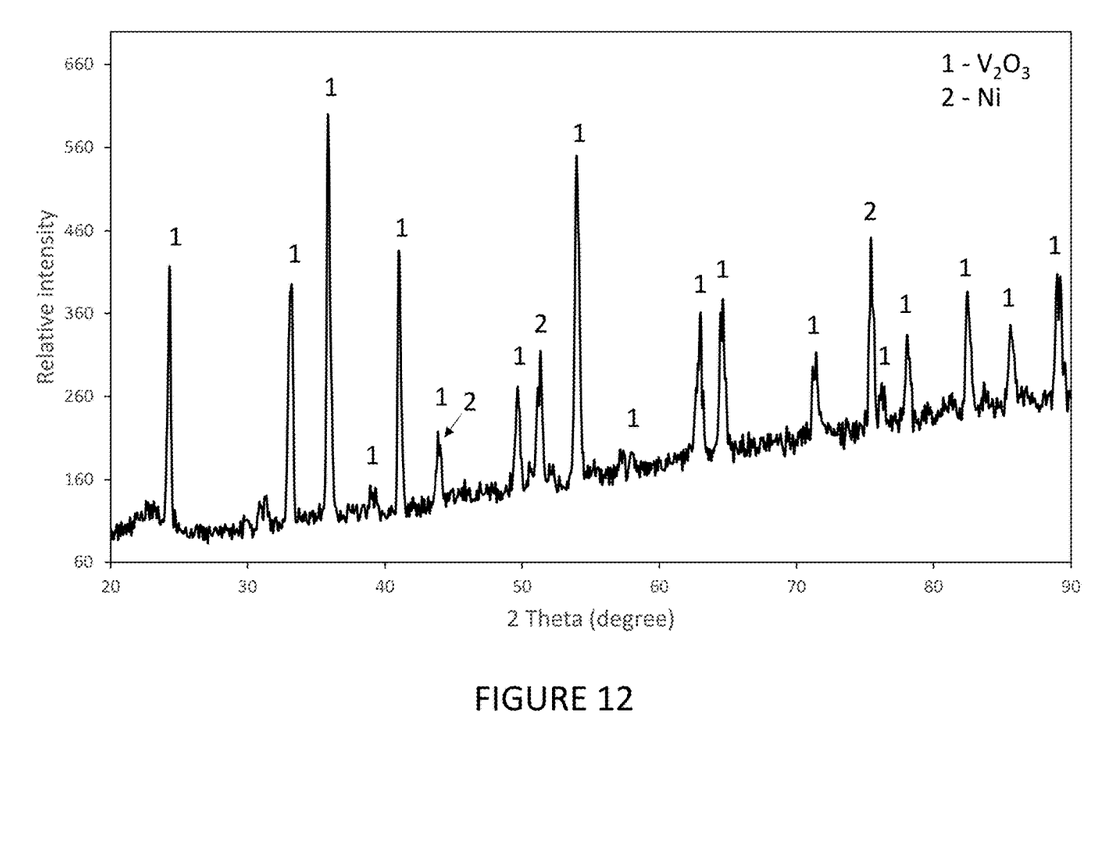
FIG. 12 shows a graph of an X-ray diffraction analysis of the agglomerated disk of products.

FIG. 11 shows the removed agglomerated disk, which is 10 mm in diameter. The left hand side of FIG. 11 shows the top 920A of the disk, while the right hand side shows the obverse, bottom 920B of the disk. Bottom 920B has a rougher surface than top 920A due to interaction with the additive layer. The bulk of the disk is formed from the dark gray vanadium oxide 1018, while cooled drops of nickel 1016 are shown as lighter patches (metallic beads) within the vanadium oxide 1018. FIG. 12 shows a graph of an X-ray diffraction analysis of the agglomerated disk or disk. The graph confirms that the agglomerated disk contains almost exclusively vanadium oxide ($V_2O_3$) and metallic nickel (Ni), which can be separated from each other using any method known in the art, such as magnetic separation or specific gravity separation. From one gram of petcoke ash having the composition noted above in Table 1, 0.485 gram of $V_2O_3$ was recovered, representing an 84% recovery yield, and 0.053 gram of Ni was recovered, representing an 86% yield.

Conclusion

It will be understood that many additional changes in the details, materials, steps and arrangement of parts, which have been herein described and illustrated to explain the nature of the subject matter, may be made by those skilled in the art within the principle and scope of the invention as expressed in the appended claims. The steps of the methods described above may be performed in any order unless the order is restricted in the discussion. Any element of any embodiment may be used in any other embodiment and/or substituted for an element of any other embodiment unless specifically restricted in the discussion.

What is claimed is:

1. A method of recovering a target material from a source material comprising the steps of:
   placing the source material in contact with a calcium-based additive layer so that the additive layer underlies the source material;
   heating the source material in an environment at or above a melting point of the source material in a reducing atmosphere for a predetermined length of time so that the source material stratifies into a main body of remnant material and a distinct portion above the main body, wherein the target material is in the distinct portion and denser than the main body;
   cooling the main body of remnant material and the distinct portion of the target material; and
   removing the distinct portion to recover the target material.

2. The method of claim 1 further comprising the step of separating a constituent metal from the distinct portion.

3. The method of claim 2, wherein the step of separating the constituent metal from the distinct portion includes specific gravity separation.

4. The method of claim 2, wherein the step of separating the constituent metal from the distinct portion includes magnetic separation.

5. The method of claim 1, wherein the additive layer is selected from the group consisting of calcium carbonate, calcium oxide, calcium hydroxide, and dolomite.

6. The method of claim 1, wherein the source material is at least one of petcoke, petcoke ash, and petcoke slag.

7. The method of claim 6, wherein the target material is nickel or vanadium.

8. The method of claim 6, wherein the target material includes nickel and vanadium.

9. The method of claim 8, wherein the nickel separates into a metal and the vanadium separates into a solid oxide.

10. The method of claim 1, wherein the reducing atmosphere is created by controlling an oxygen partial pressure in the environment.

11. The method of claim 10, wherein the oxygen partial pressure is between $10^{-0.68}$ atmospheres and $10^{-24}$ atmospheres.

12. The method of claim 1, wherein the mass ratio of the source material to the additive layer is 1:1 or less.

13. The method of claim 1, wherein the source material has a particle size of less than 2 millimeters.

14. The method of claim 1, wherein additive layer has a particle size of less than one millimeter.

15. The method of claim 1, wherein the environment at or above the melting point of the source material has a temperature of at least 600 degrees Celsius.

16. The method of claim 15, wherein the temperature is between 1400 degrees C. and 1600 degrees Celsius.

17. The method of claim 16, wherein the reducing atmosphere has an oxygen partial pressure between $10^{-6}$ atmospheres and 10-12 atmospheres.

18. The method of claim 1, wherein the predetermined length of time is at least 10 minutes.

19. The method of claim 1 further comprising the step of preheating the source material prior to the step of heating the source material for the predetermined length of time.

20. The method of claim 19, wherein the step of preheating the source material occurs during a process that generates the source material.

* * * * *